(12) United States Patent
Kolesnik et al.

(10) Patent No.: US 10,489,177 B2
(45) Date of Patent: Nov. 26, 2019

(54) RESOURCE RECONCILIATION IN A VIRTUALIZED COMPUTER SYSTEM

(71) Applicant: Red Hat Israel, Ltd., Raanana (IL)

(72) Inventors: Michael Kolesnik, Ramat-Gan (IL); Moti Asayag, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 42 days.

(21) Appl. No.: 14/628,417

(22) Filed: Feb. 23, 2015

(65) Prior Publication Data
US 2016/0246626 A1    Aug. 25, 2016

(51) Int. Cl.
*G06F 9/46* (2006.01)
*G06F 9/455* (2018.01)
*G06F 3/06* (2006.01)

(52) U.S. Cl.
CPC ........ *G06F 9/45558* (2013.01); *G06F 3/0607* (2013.01); *G06F 3/067* (2013.01); *G06F 3/0631* (2013.01); *G06F 2009/45583* (2013.01)

(58) Field of Classification Search
CPC ........... G06F 9/45533; G06F 9/455558; G06F 9/45558
See application file for complete search history.

(56) References Cited

U.S. PATENT DOCUMENTS

| | | | |
|---|---|---|---|
| 6,282,561 B1 * | 8/2001 | Jones | G06F 9/5011 718/104 |
| 6,985,937 B1 | 1/2006 | Keshav et al. | |
| 8,031,603 B1 * | 10/2011 | Polk | H04L 1/0045 370/235 |
| 8,429,276 B1 | 4/2013 | Kumar et al. | |
| 8,631,130 B2 | 1/2014 | Jackson | |
| 8,904,404 B2 * | 12/2014 | Cawlfield | G06F 9/45558 709/223 |
| 2012/0258722 A1 | 10/2012 | Liu | |
| 2013/0014107 A1 | 1/2013 | Kirchhofer | |
| 2013/0160018 A1 * | 6/2013 | Kang | G06F 9/50 718/103 |
| 2014/0019972 A1 | 1/2014 | Yahalom et al. | |
| 2014/0258446 A1 * | 9/2014 | Bursell | G06F 15/177 709/217 |

(Continued)

FOREIGN PATENT DOCUMENTS

CN    104065745 A    9/2014

OTHER PUBLICATIONS

Hacker, Thomas J. and Mahadik, Kanak, "Flexible Resource Allocation for Reliable Virtual Cluster Computing Systems", http://www.researchgate.net/publication/224266437_Flexible_resource_allocation_for_reliable_virtual_cluster_computing_systems, Nov. 12-18, 2011, 12 pages.

(Continued)

*Primary Examiner* — Camquy Truong
(74) *Attorney, Agent, or Firm* — Lowenstein Sandler LLP (57) ABSTRACT

Implementations of the disclosure provide for mechanisms for resource reconciliation in a virtualized computer system. A method of the disclosure includes receiving a request initiated by a user to allocate a first amount of a resource; determining, using a processing device, whether the request can be fulfilled in view of a second amount of the resource available in a virtualized computer system; and allocating the second amount of the resource for the user in response to determining that the request cannot be fulfilled.

18 Claims, 5 Drawing Sheets

(56) References Cited

U.S. PATENT DOCUMENTS

2016/0188594 A1\* 6/2016 Ranganathan ...... G06F 17/3048
  707/769

OTHER PUBLICATIONS

Simao, Jose and Veiga, Luis, "Flexible SLAs in the Cloud with a Partial Utility-driven Scheduling Architecture", http://www.gsd.inesc-id.pt/~jsimao/Flexible-SLAs-in-the-Cloud-With-a-Partial-Utility-Driven-Architecture.pdf, Dec. 2013, 8 pages.

Vecchiola, Christian, et al., "Deadline-Driven Provisioning of Resources for Scientific Applications in Hybrid Clouds with Aneka", http://www.buyya.com/papers/DeadlineDrivenCloudProvisioning-Aneka2011.pdf, May 14, 2011, 65 pages.

\* cited by examiner

Receives, from a client device of a user, a request for resource allocation
405

Determine that there is insufficient resource in a virtualized computer system to fulfill the request
410

Determine a priority for the request for resource allocation
415

Add an element corresponding to the request to a queue of unfulfilled requests for resource allocation
420

Associate the priority with the added element
425

Determine that an additional resource is available for allocation
430

Allocate the additional resource in view of the queue
435

RESOURCE RECONCILIATION IN A VIRTUALIZED COMPUTER SYSTEM

TECHNICAL FIELD

The implementations of the disclosure relate generally to virtualized computer systems and, more specifically, to resource allocation in a virtualized computer system.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Implementations of the disclosure provide for mechanisms for resource reconciliation in a virtualized computer system.

When provisioning a resource in a virtualized computer system, there may be a disparity between a resource requested by a user and resources available for allocation in the virtualized computer system. For example, while the user requests to create a virtual disk of 100 gigabytes, the virtualized computer system may only have 20 gigabytes of free storage space. In such an example, prior solutions for resource allocation and/or reconciliation in a virtualized computer system would fail the resource allocation and notify the user that the request cannot be fulfilled. Alternatively, the prior solutions may require the user to settle for less than the requested resource permanently.

Implementations of the disclosure address the above deficiencies by implementing a resource reconciliation mechanism that can dynamically allocate resources in a virtualized computer system until such a request is fulfilled. For example, upon receiving a request to create a virtual machine with a particular resource (e.g., 100 gigabytes of storage space), implementations of the disclosure determines that there is insufficient resource in the virtualized computer system for fulfilling the request (e.g., upon detecting 20 gigabytes of free storage space in the virtualized computer system). The virtual machine may then be created and deployed with part of the requested resource allocated to the virtual machine (e.g., by creating a virtual disk of 20 gigabytes and associating the virtual disk with the virtual machine). Implementations of the disclosure may then allocate additional resources to the virtual machine to fulfill the request when additional resources become available (e.g., when an administrator adds more resources to the virtualized computer system, when components of the virtualized computer system consume fewer resources, etc.).

Figure 1:
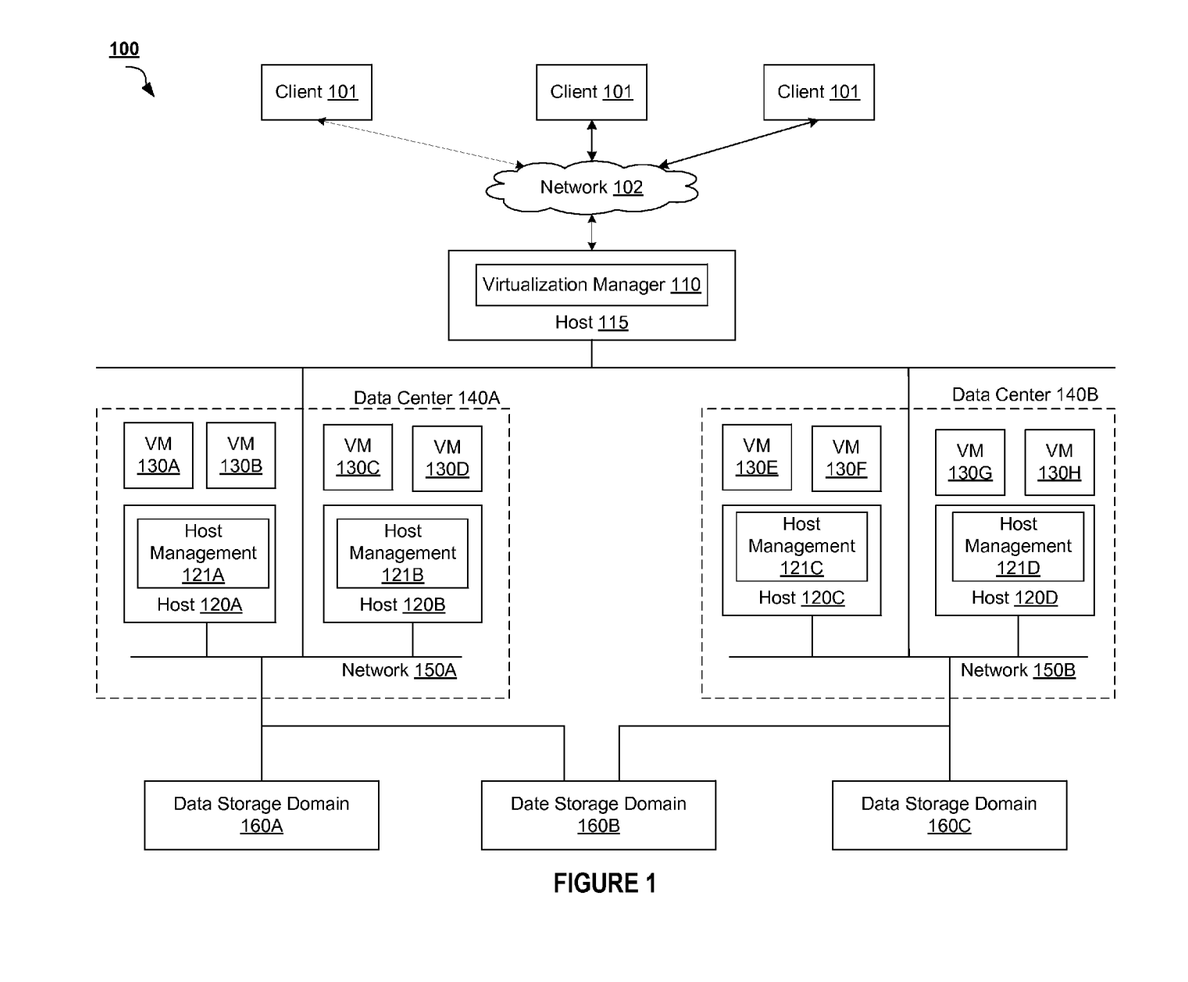
FIG. 1 is a block diagram of a system representing a virtualization environment in which implementations of the disclosure may operate.

FIG. 1 depicts a block diagram of an example of a system 100 representing a virtualized environment in which implementations of the disclosure may operate. As illustrated, system 100 may include one or more client devices 101 communicatively coupled to one or more host computer systems 115, 120A-D, and/or any other component of system 100 via a network 102. Each client device 101 may include computing devices that have a wide range of processing capabilities. For example, each client device 101 may be a personal computer (PC), palm-sized computing device, personal digital assistant (PDA), table computing device, mobile phone, wearable computing device, and so on.

Network 102 may be a private network (e.g., a local area network (LAN), a wide area network (WAN), intranet, etc.) or a public network (e.g., the Internet). Network 102 can provide one or more communication channels for host computer systems 115 and/or 120A-D and client device(s) 101 to exchange data, commands, and the like. These communication channels can be established using any suitable network protocol, such as the Secure Shell (SSH) protocol, the Simple Protocol for Independent Computing Environments (SPICE) protocol, and/or any other suitable network protocol that can facilitate interactions and/or communication between host computer systems 115 and/or 120A-D and client device(s) 101.

Each of host computer systems 115, 120A-120D may include one or more processing devices (CPUs) communicatively coupled to memory devices and input/output (I/O) devices, as described in more details herein below with references to FIG. 5.

Each of host computer systems 120A-120D may run one or more virtual machines (VMs) 130 (e.g., VMs 130A-130H), by executing a hypervisor to abstract the physical layer, including processors, memory, and I/O devices, and present this abstraction to the virtual machines as virtual devices. A virtual machine 130 may execute a guest operating system which may utilize the underlying virtual devices, including virtual processors, virtual memory, and virtual I/O devices. One or more applications may run on virtual machine 130 under the guest operating system. System 100 may include any number of virtualization mangers 110 manage any number of host computing systems 120 hosting any number of VMs 130.

In some implementations, host computer system 120A-120D may be grouped into one or more logical groups, such as data centers 140a-140B. Each host computer system 120 may run a host management module 210 that may manage and/or monitor storage, memory, network interfaces, and/or any other aspects of host operations for host computer system 120. In one implementation, host management module 112 may be provided by a Virtual Desktop and Server Management (VDSM) daemon.

Host computer systems of each data center 140A-B may be communicatively coupled, via a network 150 (e.g., network 150A, 150B), to one or more storage domains 160 (e.g., data storage domains 160A, 160B). Network 150 may be a private network (e.g., a local area network (LAN), a wide area network (WAN), intranet, etc.) or a public network (e.g., the Internet). Network 150 may or may not be the same as network 102 in some implementations.

Each storage domain 160 may include one or more storage devices, such as storage devices that can handle data at a block level, storage devices that can implement a file system, etc. Each storage domain 160 may support one or more storage types and/or protocols, such as Fiber Channel Protocol (FCP), Fiber Channel over Ethernet (FCoE), Internet Small Computer System Interface (iSCSI), Network File System (NFS), Portable Operating System Interface (POSIX) file system, GlusterFS file system, etc. In some implementations, each storage domain 160 may be implemented by a local files system, an NFS export, a logical volume manager (LVM) virtual group, etc.

A storage domain 160 may store data for various components of system 100, such as one or more VMs 130A-H, hosts 120A-D, etc. In one example, a storage domain 160 may store virtual disk images for one or more VMs. In some implementations, a storage domain 160 (e.g., storage domain 160A) may be associated with a given data center (e.g., data center 140A) and may store data for hosts and/or VMs in the data center.

System 100 may also include a virtualization manager 110 that can perform various managerial functions for system 100. In one example, virtualization manager 110 can manage VMs 130A-H by creating, deploying, starting, stopping, migrating, monitoring, and/or perform any other managerial function on VMs 130A-130H. In another example, virtualization manager 110 may add logical networks, attach the logical networks to one or more host systems 150 and/or VMs 130, and/or perform any other network management function. In a further example, virtualization manager 110 may manage data storage domains, virtual disks, and/or perform any other storage management functionality. In still another example, virtualization manager 110 may monitor operations of various components of system 100 (e.g., hosts 120A-D, VMs 130A-H, network 150A-B, data storage domains 160A-C, etc.) and resources for allocation the components of system 100.

Virtualization manager 110 may include various interfaces, including administrative interface, reporting interface, and/or application programming interface (API) to communicate with client devices 101, host computer systems 120A-120D, and/or any other component of system 100 (e.g., user portals, databases, directory servers and various other components which are omitted from FIG. 1 for clarity). In one implementation, virtualization manager 110 may communicate with host management module 121A-D via an API, such as a Representational State Transfer (REST) API, a VDSM API, etc.

Virtualization manager 110 may provide a graphical user interface (GUI) to client device(s) 101 to enable users of client device(s) 101 to create, configure, manage, etc. various components of system 100. In one example, upon logging into a user portal or an administrative portal provided by virtualization manager 110, a user may request a virtual machine be created and deployed on a host computer system 120 (e.g., via the GUI). Additionally, the user may request certain resources be allocated to the virtual machine, such as processing resources, storage resource, memory resource, network resources, etc. For example, the user may request allocation of a particular amount of a particular resource (e.g., 100 gigabytes of storage space, 1 megabyte of memory, a virtual network interface with a given bandwidth (e.g., a bandwidth of 2 gigabits per second), etc.). In another example, after the creation and/or deployment of the virtual machine on a host, the user may request more resources be allocated to the virtual machine.

In some implementations, there may be a disparity between the resource requested by the user and resources available for allocation to the virtual machine. For example, while the user requests allocation of 100 gigabytes of storage space to the virtual machine, there may be 20 gigabytes of storage space available in system 100 for allocation to the virtual machine. Virtualization manager 110 may allocate 20 gigabytes of storage space to the virtual machine (e.g., by creating a virtual disk image of 20 gigabytes and associating the virtual disk image with the virtual machine). Virtualization manager 100 may then monitor resources available for allocation to the virtual machine and fulfill the request by implementing a resource reconciliation mechanism.

In some implementations, virtualization manager 110 may provide a GUI to a user to enable the user to manage multiple virtual machines. In one example, the GUI may present information related to operations of the virtual machines, such as a list of the virtual machines, resources consumed by each of the virtual machines, resources allocated to each of the virtual machines, I/O operations performed by each of the virtual machines, etc. In another example, the user may assign a priority to each of the virtual machines using the GUI. A request to allocate resources to a virtual machine having a high priority may be fulfilled before a request to allocate resources to a virtual machine having a low priority is fulfilled.

Further description of virtualization manager 110 and its various functions are described in more detail below with respect to FIG. 2.

Figure 2:
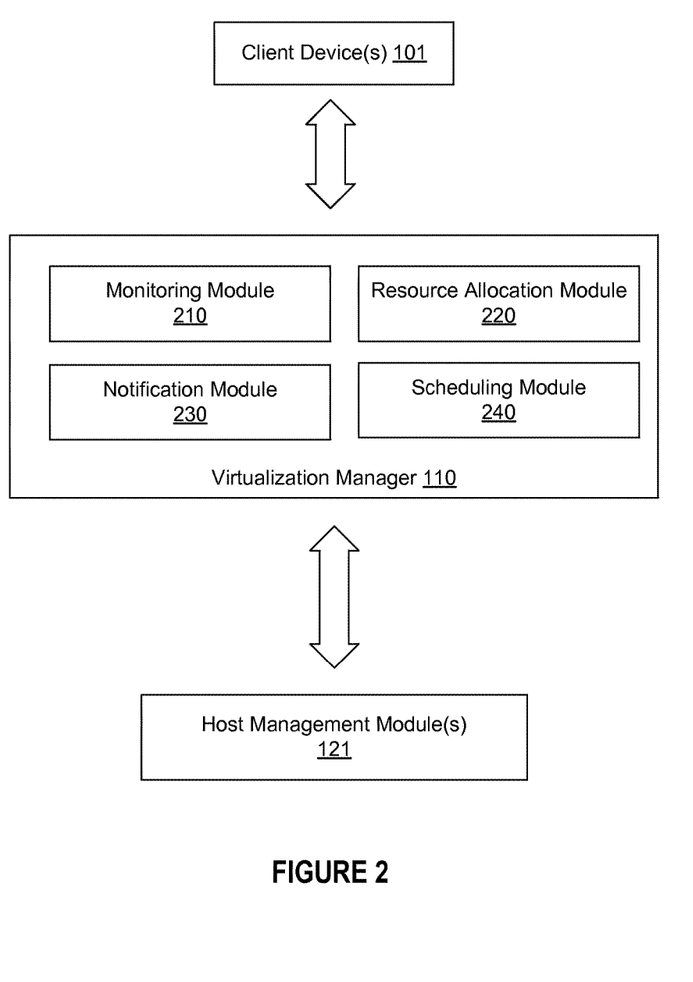
FIG. 2 is a block diagram of a detailed view of a virtualization manager, a host management module, and a client device according to an implementation of the disclosure.

FIG. 2 depicts a block diagram illustrating an example of a virtualization manager operatively coupled to one or more client devices 101 and host management modules 121 in accordance with some implementations of the disclosure. The virtualization manager, the client devices, and the host management modules of FIG. 2 may be same as virtualization manager 110, client devices 101, and host management modules 121 of FIG. 1, respectively.

As illustrated, virtualization manager 110 may include a monitoring module 210, a resource allocation module 220, a notification module 230, a scheduling module 240, and/or any other suitable component for implementing resource allocation and/or reconciliation mechanisms and/or perform any other suitable function.

Monitoring module 210 may monitor resources that can be utilized by various components of a virtualized computer system (e.g., system 100, a host computer system 120, a data center 140, and/or one or more data storage domains 160 of FIG. 1). Examples of the resources may include processing resources (e.g., CPUs, virtual processing units, etc.), memory resources (e.g., physical memory, virtual memory, etc.), storage resources (e.g., storage space available in one or more data storage domains, host computer systems 120, etc.), network resources (e.g., a network bandwidth), etc.

In one example, monitoring module 210 may collect data related to resources available in the virtualized computer system. In one example, the data may include information about resources consumed by one or more components of the virtualized computer system (e.g., storage space, memory, network bandwidths, etc. consumed by one or more VMs, hosts, etc.). In another example, the data may include information related to input/output (I/O) operations (e.g., write operations, read operations, etc.) performed by one or more components of the virtualized computer system. In a further example, the data may include information related to resources that can be provided by one or more components of the virtualized computer system (e.g., storage space provided by one or more data storage domains, host computer systems, etc.). Monitoring module 210 may collect the data by polling host management module(s) 121 for the data periodically, at random intervals, responsive to an event (e.g., a user request for allocation resources to a VM), and/or in any other suitable manner.

Resource allocation module 220 may allocate resources that may be utilized by various components of the virtualized computer system. In one implementation, resource allocation module 220 may receive, from a client device 101, a resource allocation request. The allocation request may be and/or include a request for allocation of a particular amount of the resource (e.g., 100 gigabytes of storage space, 1 megabyte of memory, a network bandwidth of 100 megabits per second, etc.). In one example, the request may be and/or include a request to create and/or deploy the virtual machine on a host computer system. In another example, the request may be and/or include a request to allocate additional resource to the virtual machine running on a host computer system. In still another example, the request may be and/or include a request to create a virtual disk, a virtual network interface, and/or any other device using the requested resource.

Upon receiving the request, resource allocation module 220 may determine an amount of the resource in the virtualized computer system available for allocation (also referred to as "available resource"). The available resource can be determined using data related to resources available in the virtualized computer system (e.g., the data collected by monitoring module 210 as described above).

Resource allocation module 220 may then determine whether the available amount of the resource is sufficient to fulfill the request, e.g., whether the available amount is equal or exceeds the requested amount. In response to determining that the available resource is sufficient to fulfill the request, resource allocation module 220 allocates the requested resource for the user. For example, resource allocation module 220 receives a request to allocate 100 gigabytes of storage space to a virtual machine and determines that the virtualized computer system has more than 100 gigabytes of free storage space. Resource allocation module 200 then allocates 100 gigabytes of storage space for the user by instructing one or more host management module(s) 121 to create a virtual disk of 100 gigabytes and to associate the virtual disk image with the virtual machine.

In some implementations in which the available resource is insufficient to fulfill the request, notification module 230 may send a message to the client device 101 indicating that there is insufficient resource in the virtualized computer system to fulfill the request. The message may also indicate that virtualization manager 110 may implement a resource reconciliation mechanism for the user (e.g., allocating the available resource to the virtual machine and fulfilling the request when additional resources become available). The message may be communicated to the client device 101 using a GUI, a command-line interface (CLI), etc. Notification module 230 may also prompt the user to indicate whether the available resource is to be allocated for the user and/or whether the resource reconciliation mechanism is to be implemented (e.g., by providing one or more GUIs).

The user may provide one or more inputs indicating that the available resource is to be allocated for the user and/or that the reconciliation mechanism is to be implemented (via a GUI, CLI, etc. provided by virtualization manager 110). Upon receiving the inputs, the client device 101 may send a message to the virtualization manager 110 indicating that the available resource is to be allocated to the virtual machine and/or that the reconciliation mechanism is to be implemented.

In some implementations, upon receiving the message, resource allocation module 220 may allocate the available resource for the user. In one example, resource allocation module 220 may transmit a message to one or more host management modules 121 instructing host management module(s) 121 to allocate the available resource to create a virtual disk using the available resource (e.g., a storage resource). In response to receiving the message, host management module(s) 121 may create a virtual disk using the available resource in a data storage domain and may associate the virtual disk with a virtual machine. In another example, resource allocation module 220 may send a message to one or more host manager modules 121 instructing host management module(s) 121 to create a network interface using the available resource (e.g., a network resource).

Upon allocating the available resource to the virtual machine, virtualization manager 110 may monitor resources in the virtualized computer system and implement a resource reconciliation mechanism to fulfill the request. For example, virtualization manager 110 may monitor resources available in one or more portions of the virtualized computer system (e.g., system 100, one or more host computer systems, data centers, data storage domains, etc.) to determine whether additional resources become available in the virtualized computer system. In response to determining that an additional amount of the resource (e.g., 20 gigabytes of storage space, 1 megabyte of memory, etc.) is available in the virtualized computer system, virtualization manager 110 may allocate the additional amount of the resource for the user. If the request is not fulfilled after allocation of the additional amount of the resource, virtualization manager 110 may iterate the resource reconciliation mechanism until the request is fulfilled. In one implementation, the resource reconciliation mechanism may be implemented by performing one or more operations described below in connection with FIGS. 3 and 4.

While implementing the resource reconciliation mechanism, notification module 230 may notify the user of the status of the request by sending a message and/or providing a GUI to a client device of the user. In one example, notification module 230 may notify the user of the allocation of the available resource, the allocation of the additional resource, etc. In another example, notification module 230 may notify the user of a completion status of the request upon fulfilling the request by allocating the requested resource to the virtual machine.

In still another example, notification module 230 may notify the user of an incompletion status of the request upon determining that the request has not been fulfilled. In some implementations, the user may indicate that it is unnecessary to allocate more resource to the virtual machine to fulfill the request. Upon receiving such an indication, virtualization manager 110 may regard the request as having been fulfilled.

Virtualization manager 110 may manage resource allocation and reconciliation for unfulfilled resource allocation requests submitted by one or more users. Each of the requests may be awaiting allocation of additional resources (e.g., additional storage space, additional memory, additional network bandwidths, etc.).

Scheduling module 240 may implement a priority scheme to fulfill the unfulfilled requests for the users (e.g., requests that have been partially fulfilled, requests that have not been allocated any resource, etc.). For example, scheduling module 240 may assign a priority to each of the requests in view of information related to users associated with the requests (e.g., a service level agreement (SLA) to which a user subscribes), timing information related to each of the requests (e.g., information related to when each of the requests was created), and/or any other suitable information that can be used to prioritize a request for resource allocation. In one example, scheduling module 240 may assign a higher priority to a request associated with a user with a higher priority (e.g., a user that has subscribed to a certain SLA).

In another example, multiple unfulfilled requests may be associated with a given user. The user may assign a priority to each of the unfulfilled requests (e.g., via a GUI, a CLI, etc. provided by virtualization manager 110).

In a further example, multiple unfulfilled requests correspond to multiple virtual machines of a given user. The user may assign a priority to each of the virtual machines. Scheduling module 240 may then prioritize the requests in view of the priorities assigned to the virtual machines (e.g., associating a high priority with a unfulfilled request if the unfulfilled corresponds to a virtual machine associated with a high priority).

In some implementations, scheduling module 240 may prioritize unfulfilled requests for resource allocation in view of priorities assigned to the unfulfilled requests. In one example, scheduling module 240 allocates the additional resource to an unfulfilled request associated with a certain priority (e.g., the highest priority, the second highest priority, etc.). In another example, scheduling module 240 allocates the additional resource to multiple unfulfilled requests in view of priorities associated with the unfulfilled requests. In one implementation, scheduling module 240 determines that the multiple unfulfilled requests are associated with the same or similar priorities. The processing device then allocates a portion of the additional resource to each of the unfulfilled requests. In one example, two unfulfilled requests for resource allocation are associated with the same priority and are awaiting additional storage space to be allocated. Upon detecting 2 gigabytes of additional storage space, scheduling module 240 may allocate 1 gigabyte of storage space to each of the unfulfilled requests.

In some implementations, scheduling module 240 may generate a queue including multiple elements. Each of the elements may correspond to an unfulfilled request and may be associated with a priority. A request associated with a high priority may be fulfilled before a request associated with a low priority. In one example, the queue may facilitate prioritizing requests in view of the timing of the creation of each unfulfilled request. In some implementations, the requests may be prioritized by performing one or more operations depicted in FIG. 4.

Figure 3:
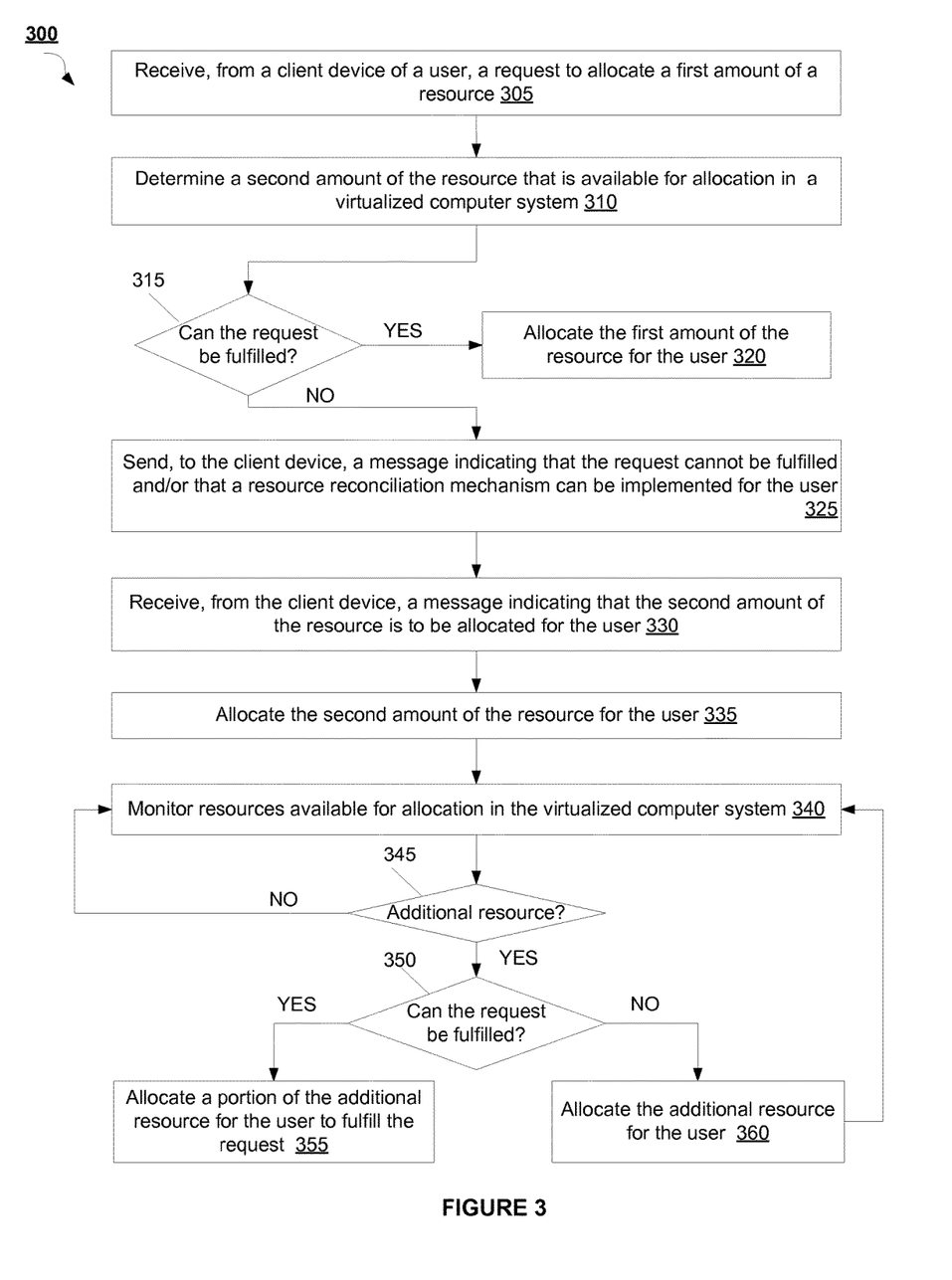
FIG. 3 is a flow diagram illustrating a method for resource reconciliation in a virtualized computer system according to an implementation of the disclosure.

FIG. 3 is a flow diagram illustrating a method 300 for resource reconciliation in a virtualized computer system according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by a processing device (e.g. a processing device 502 of FIG. 5) executing a virtualization manager 110 as described in connection with FIGS. 1 and 2.

Method 300 begins at block 305 where the processing device receives, from a client device of a user, a request for a first amount of a resource. The resource can be and/or include a memory resource, a storage resource (e.g., storage space of a given size), a processing resource (e.g., a number of CPUs or virtual processing units), a network resource (e.g., a network bandwidth), and/or any other resource provided by a virtualized computer system. In one example, the processing device receives a request to create a virtual disk of 100 gigabytes for a virtual machine. In another example, the processing device receives a request to create a virtual network interface with a bandwidth of 2 gigabits per second.

At block 310, the processing device can determine a second amount of the resource that is available for allocation in a virtualized computer system. The virtualized computer system may include one or more host computer systems, storage data domains, and/or any other suitable component for providing the requested resource.

At block 315, the processing device can determine whether the request can be fulfilled. For example, the processing device determines that the request can be fulfilled in response to determining that the second amount is greater than or equal to the first amount. Alternatively, the processing device determines that the request cannot be fulfilled in response to determining that the second amount is not greater than the first amount.

At block 320, in response to determining that the second amount of the resource is sufficient to fulfill the request, the processing device can allocate the first amount of the resource for the user. In one example, the processing device can create a virtual disk of the first amount of storage space. The processing device can also associate the virtual disk with a virtual machine (e.g., a virtual machine running in the virtualized computer system, a new virtual machine that is created and deployed for the user, etc.). In another example, the processing device can create a virtual network interface with a bandwidth of the first amount.

Alternatively, in response to determining that the second amount of the resource is insufficient to fulfill the request, the processing device can proceed to block 325 and can transmit, to the client device, a message indicating that there is insufficient amount of the resource to fulfill the request and/or that a resource reconciliation mechanism can be implemented for the user.

At block 330, the processing device can receive, from the client device, an indication that the available resource is to be allocated for the user and/or that the resource reconciliation mechanism is to be implemented for the user. The processing device can then allocate the second amount of the resource for the user at block 335. In one example, the processing device receives a request for allocating storage space of 100 gigabytes to a virtual machine and determines that 20 gigabytes of storage space is available in the virtualization computer system. The processing device may then create a virtual disk of 20 gigabytes and associate the virtual disk with the virtual machine. In another example, the processing device receives a request for a virtual network interface with a bandwidth of 2 gigabits per second and determines that the available bandwidth that can be provided to the virtual network interface is 1 gigabit per second. The processing device may then create a virtual network interface with a bandwidth of 1 gigabit per second.

At block 340, the processing device can monitor resources that are available in the virtualized computer system. The monitoring can be performed periodically, at random intervals, upon detecting a given event, and/or in any other suitable manner. In one implementation, the monitoring can be performed using the monitoring module 210 of FIG. 2.

At block 345, the processing device can determine whether an additional amount of the resource is available in the virtualized computer system in view of the monitoring. In some implementations, in response to determining that no additional amount of the resource is available in the virtualized computer system, the processing device can loop back to block 340.

Alternatively, in response to determining that there is an additional amount of the resource available in the virtualized computer system, the processing device can proceed to block 350 and can determine whether the additional amount of the resource is sufficient to fulfill the request. For example, the processing device determines that the additional amount of the resource is sufficient to fulfill the request in response to determining that the additional amount is not less than a difference between the first amount and the amount of the resource that has been allocated to the virtual machine.

In some implementations, in response to determining that the additional amount of the resource is sufficient to fulfill the request, the processing device can proceed to block 355 and can allocate a portion of the additional resource for the user to fulfill the request. In some implementations, the portion of the additional resource is the difference between the first amount and the amount of the resource that has been allocated to the virtual machine.

Alternatively, in response to determining that the additional amount of the resource is insufficient to fulfill the request, the processing device can proceed to block 360 and can allocate the additional amount of the resource for the user. The processing device can then loop back to block 340.

Figure 4:
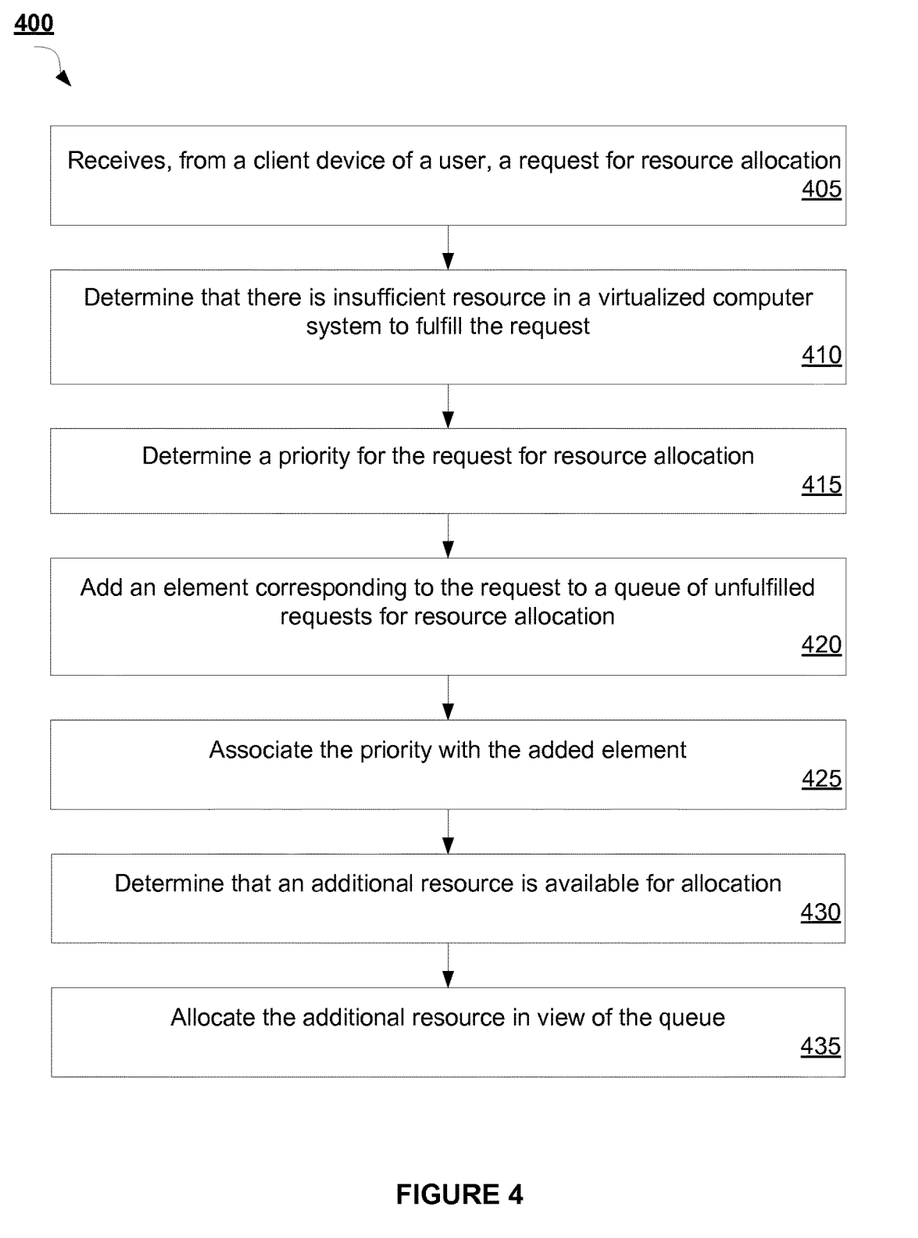
FIG. 4 is a flow diagram illustrating a method for resource reconciliation in a virtualized computer system using a priority scheme according to an implementation of the disclosure.

FIG. 4 is a flow diagram illustrating a method 400 for resource reconciliation in a virtualized computer system using a priority scheme according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a processing device (e.g. a processing device 502 of FIG. 5) executing a virtualization manager 110 as described in connection with FIGS. 1 and 2.

Method 400 begins at block 405 where the processing device receives, from a client device of a user, a request for resource allocation. The request may be and/or or include a request for a memory resource (e.g., virtual memory of a given size), a storage resource (e.g., storage space of a given size), a processing resource (e.g., a number of CPUs or virtual processing units), a network resource (e.g., a network bandwidth), etc. The request may be and/or include a request to create a virtual disk, a virtual machine, a network interface, etc.

At block 410, the processing device can determine that there is insufficient resource in a virtualized computer system to fulfill the request. This determination can be made by performing operations described above in connection with 310 and/or 315 of FIG. 3.

At block 415, the processing device can determine a priority for the request. For example, the processing device determines the request in view of information related to the user (e.g., a SLA to which the user subscribes), a priority assigned to a virtual machine related to the request by the user, timing information related to the request, and/or any other suitable information that can be used to determine a priority for an unfulfilled request.

At block 420, the processing device can add an element corresponding to the request to a queue of unfulfilled requests for resource allocation. The queue may include multiple elements. Each of the elements may correspond to an unfulfilled request for resource allocation. Each of the elements may be associated with a priority.

At block 425, the processing device can associate the priority with the added element. In some implementations, each element of the queue may be associated with a priority.

At block 430, the processing device can determine that an additional resource is available for allocation. For example, the additional resource may be and/or include storage space, memory, processing units, network bandwidths, etc.

At block 435, the processing device can allocate the additional resource in view of the queue. In one example, the processing device allocates the additional resource to an unfulfilled request in the queue that is associated with a certain priority (e.g., the highest priority, the second highest priority, etc.). In another example, the processing device allocates the additional resource to multiple unfulfilled requests in the queue in view of priorities associated with the unfulfilled requests. In one implementation, the processing device determines that the multiple unfulfilled requests are associated with the same or similar priorities. The processing device then allocates a portion of the additional resource to each of the unfulfilled requests.

Figure 5:
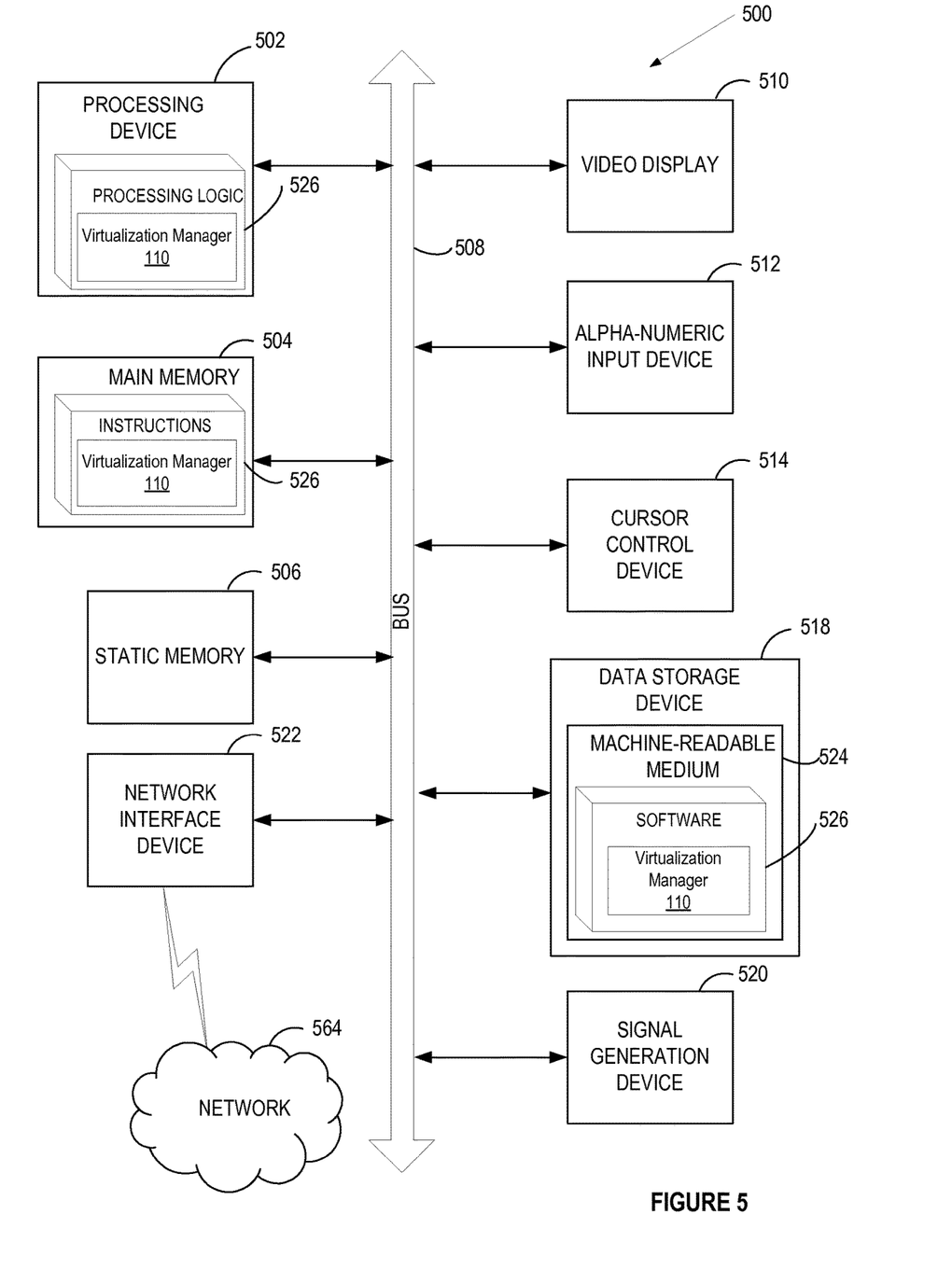
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 602 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 808.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 614 (e.g., a mouse), and a signal generation device 520 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 for providing resource reconciliation in a virtualized computer system, such as the virtualization manager 110 as described with respect to FIGS. 1 and 2, and/or a software library containing methods that call the above applications. While the machine-accessible storage medium 524 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "deploying," "providing," "executing," "storing," "managing," "allocating," "prioritizing," "associating," "assigning," "adding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   receiving a first request initiated by a user to allocate a first amount of a resource in a virtualized computer system, wherein the first request identifies that resource reconciliation is to be implemented;
   determining, using a processing device, whether the first request is to be fulfilled in view of a second amount of the resource available in the virtualized computer system;
   allocating the second amount of the resource for the user in response to determining that the first request is not to be fulfilled in the virtualized computer system, wherein the second amount of the resource is less than the first amount of the resource;
   in response to determining that an additional amount of the resource is available for allocation in the virtualized computer system, determining whether the additional amount of the resource is less than a difference between the first amount of the resource and the second amount of the resource; and
   in view of a determination that the additional amount of the resource is less than the difference between the first amount of the resource and the second amount of the resource, allocating the additional amount of the resource for the user to fulfill the first request.

2. The method of claim 1, wherein allocating the additional amount of the resource for the user further comprises allocating a portion of the additional amount of the resource for the user in response to determining that the first request is to be fulfilled using the portion of the additional amount of the resource.

3. The method of claim 1, wherein allocating the additional amount of the resource for the user further comprises allocating the additional amount of the resource for the user in response to determining that the first request is to be fulfilled using the additional amount of the resource.

4. The method of claim 1, further comprising:
   determining a first priority for the first request; and
   allocating, using the processing device, at least a portion of the additional amount of the resource in view of the first priority.

5. The method of claim 4, further comprising:
   adding an element to a queue of unfulfilled requests for resource allocation, wherein the queue of unfulfilled requests comprises a second request associated with a second priority; and
   associating the first priority with the element.

6. The method of claim 4, wherein the first priority is determined in view of at least one of a service level agreement associated with the user or timing information related to the first request.

7. The method of claim 1, wherein the first request comprises at least one of a request to allocate a storage resource, a request to allocate a memory resource, or a request to allocate a network resource.

8. A system, comprising:
   a memory; and
   a processing device, operatively coupled to the memory, to:
     receive a first request initiated by a user to allocate a first amount of a resource in a virtualized computer system, wherein the first request identifies that resource reconciliation is to be implemented;
     determine whether the first request is to be fulfilled in view of a second amount of the resource available in the virtualized computer system;
     allocate the second amount of the resource for the user in response to determining that the first request is not to be fulfilled in the virtualized computer system, wherein the second amount of the resource is less than the first amount of the resource;
     in response to determining that an additional amount of the resource is available for allocation in the virtualized computer system, determine whether the additional amount of the resource is less than a difference between the first amount of the resource and the second amount of the resource; and
     in view of a determination that the additional amount of the resource is less than the difference between the first amount of the resource and the second amount of the resource, allocate the additional amount of the resource for the user to fulfill the first request.

9. The system of claim 8, wherein, to allocate the additional amount of the resource for the user, the processing device is further to allocate a portion of the additional amount of the resource for the user in response to determining that the first request is to be fulfilled using the portion of the additional amount of the resource.

10. The system of claim 8, wherein, to allocate of the additional amount of the resource for the user, the processing device is further to allocate the additional amount of the resource for the user in response to determining that the first request is to be fulfilled using the additional amount of the resource.

11. The system of claim 8, wherein the processing device is further to:
    determine a first priority for the first request; and
    allocate at least a portion of the additional amount of the resource in view of the first priority.

12. The system of claim 11, wherein the processing device is further to:
    add an element to a queue of unfulfilled requests for resource allocation, wherein the queue of unfulfilled requests comprise a second request associated with a second priority; and
    associate the first priority with the element.

13. The system of claim 8, wherein the first request comprises at least one of a request to allocate a storage resource, a request to allocate a memory resource, or a request to allocate a network resource.

14. A non-transitory machine-readable storage medium including instructions that, when accessed by a processing device, cause the processing device to:
    receive a first request initiated by a user to allocate a first amount of a resource in a virtualized computer system, wherein the first request identifies that resource reconciliation is to be implemented;
    determine, by the processing device, whether the first request is to be fulfilled in view of a second amount of the resource available in the virtualized computer system;
    allocate the second amount of the resource for the user in response to determining that the first request is not to be fulfilled in the virtualized computer system, wherein the second amount of the resource is less than the first amount of the resource; and in response to determining that an additional amount of the resource is available for allocation in the virtualized computer system, determine whether the additional amount of the resource is less than a difference between the first amount of the resource and the second amount of the resource; and in view of a determination that the additional amount of the resource is less than the difference between the first amount of the resource and the second amount of the resource, allocate the additional amount of the resource for the user to fulfill the first request.

15. The non-transitory machine-readable storage medium of claim 14, wherein, to allocate the additional amount of the resource for the user, the processing device is further to allocate a portion of the additional amount of the resource for the user in response to determining that the first request is to be fulfilled using the portion of the additional amount of the resource.

16. The non-transitory machine-readable storage medium of claim 14, wherein, to allocate the additional amount of the resource for the user, the processing device is further to allocate the additional amount of the resource for the user in response to determining that the first request is to be fulfilled using the additional amount of the resource.

17. The non-transitory machine-readable storage medium of claim 14, wherein the processing device is further to:
determine a first priority for the first request; and
allocate the at least a portion of the additional amount of the resource in view of the first priority.

18. The non-transitory machine-readable storage medium of claim 17, wherein the processing device is further to:
add an element to a queue of unfulfilled requests for resource allocation, wherein the queue of unfulfilled requests comprises a second request associated with a second priority; and
associate the first priority with the element.

* * * * *